United States Patent [19]

Stobb

[11] Patent Number: 4,658,715
[45] Date of Patent: Apr. 21, 1987

[54] SYSTEM FOR AUTOMATING THE PALLETIZING OF BUNDLES

[75] Inventor: Walter J. Stobb, Pittstown, N.J.

[73] Assignee: Stobb Inc., Clinton, N.J.

[21] Appl. No.: 851,589

[22] Filed: Apr. 14, 1986

[51] Int. Cl.⁴ .............................................. B65B 13/02
[52] U.S. Cl. .......................................... 100/2; 100/7; 414/71
[58] Field of Search ...................... 100/2, 7, 8; 414/71

[56] References Cited

U.S. PATENT DOCUMENTS

| | | | |
|---|---|---|---|
| 2,933,314 | 4/1960 | Stobb | 100/7 X |
| 3,022,617 | 2/1962 | Miller et al. | |
| 4,311,090 | 1/1982 | Dudziak | 100/7 X |
| 4,419,035 | 12/1983 | Stobb | |
| 4,498,381 | 2/1985 | Convey | 100/7 X |
| 4,519,740 | 5/1985 | Stobb | |
| 4,554,867 | 11/1985 | Thumm | 100/7 X |

FOREIGN PATENT DOCUMENTS 2721675 5/1977 Fed. Rep. of Germany .
595922 12/1947 United Kingdom .
992487 5/1965 United Kingdom .

*Primary Examiner*—Billy J. Wilhite
*Attorney, Agent, or Firm*—Arthur J. Hansmann

[57] ABSTRACT

A system for automating the stacking of bundles onto a pallet, and including a stacker for positioning bundles of sheets into discrete stacks, a strapper for tying the bundles and a lift mechanism for raising the bundles to an elevation. A pallet is positioned onto a pallet holder at the elevation and the bundles are placed onto the elevated pallet. A lift means supports the pallet while bundles are continued to be placed thereon, and the pallet holder is then moved clear so that the pallet can be lowered for additional loading and for ultimate removal, with the removal process taking place while another pallet is placed onto the pallet holder.

18 Claims, 6 Drawing Figures

SYSTEM FOR AUTOMATING THE PALLETIZING OF BUNDLES

This invention relates to a system for automating the stacking of bundles onto a pallet, and it includes both the apparatus and method for palletizing. Further, the bundles are stacked and bound sheets from a printing press.

BACKGROUND OF THE INVENTION

The graphic arts industry is already aware of apparatus and method for stacking bundles of sheets onto a pallet, that is, the so-called palletizing. U.S. Pat. Nos. 4,419,035 and 4,519,740, owned by the owner of the present invention, both show the stacking of bound bundles onto a pallet which is supported on a scissors table. Also, another example of palletizing is shown in an advertisement of a company CIVIEMME S.r.l., of Italy, per its advertisement filed herewith, but which only shows the lowering of a pallet while it is being loaded with bundles from above. Further, U.S. Pat. No. 3,022,617 shows the loading of kegs onto a pallet which is in the raised position, and the pallet is lowered while more kegs are placed thereon, and eventually the pallet with the kegs is lowered to a conveyor which moves the load to one side. German Pat. No. 2721675 also shows the loading of sheets onto a scissors table or the like by means of an overhead crane which deposits unbound sheets onto the table. British Pat. No. 595922 shows the lifting of a stack of sheets up to a feeder, and with the sheets resting on a support which is under the control or the lifting device. British Pat. No. 992487 shows an article stacker.

In all instances of the prior art, such as that mentioned above, there is no system whereby the bound stack of sheets are deposited onto a pallet which is lowered in accordance with the layering of the bundles on the pallet, and where the pallet is separately supported by a support means in addition to the elevator lift means or scissors table or the like. That is, the additional pallet support means utilized in this invention permits the filled pallet to be in the process of lowering and removal while at the same time the next pallet is already supported in position and is being loaded. As such, the present invention provides for a system, including apparatus and method, whereby high-speed palletizing is accomplished in that there is no delay or waiting time while one loaded pallet is being removed and before another pallet can be positioned for loading it.

Accordingly, the present invention provides for the system whereby a continuous movement of the bundles is possible, and there is no delay nor interruption in the removal of a loaded pallet while the next pallet is simply being retained in a position for loading it. The present invention provides for the continuous bundle movement and loading, and the loading is done at an elevated position and the pallet is then lowered while another pallet is placed in the elevated position and is being loaded while the previous pallet with its load is being removed.

In general, the present invention provides for a system, including method and apparatus, for the continuous flow of bundles of sheets from a printing press to a pallet, including the stacking, strapping, and movement from those locations and onto a pallet. The accomplishment of this object also includes the automatic positioning of each successive pallet at the elevated location where the bundles are placed onto the pallet while the previous pallet with its bundles is being removed from that location.

DETAILED DESCRIPTION OF THE PREFERRED SYSTEM

Figure 1:
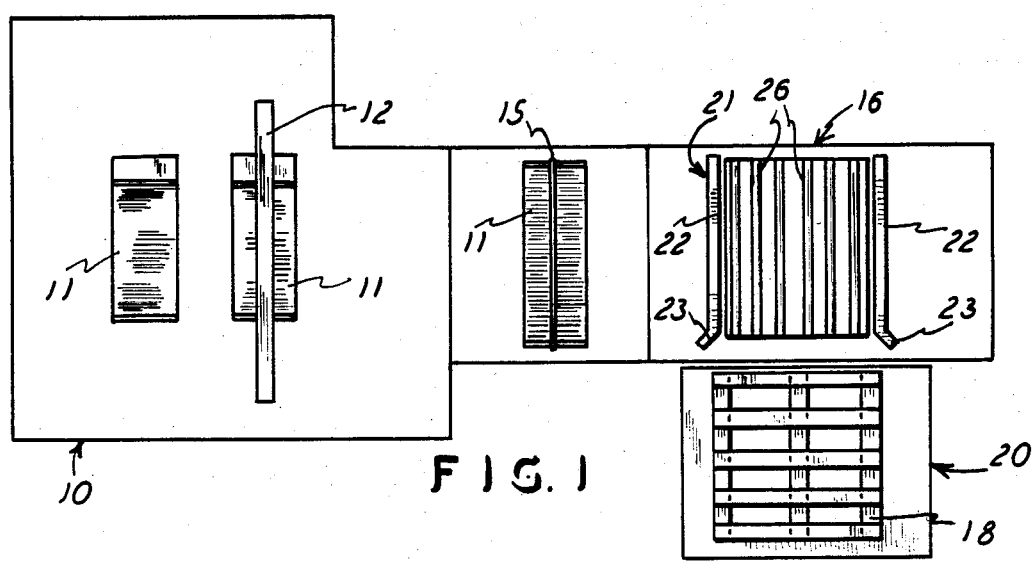
FIG. 1 is a diagrammatic top plan view of the system of this invention.
Figure 2:
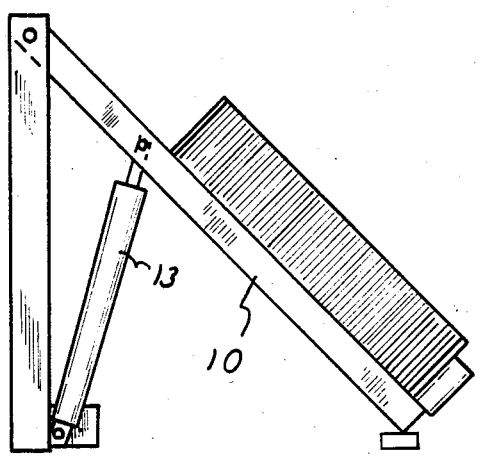
FIG. 2 is a side elevational view of the stacker portion in one position.

The drawings, and the following description, are directed at the entire system, and include the description of the apparatus and the method. FIG. 1 shows the diagrammatic plan view of the system which includes a conventional type of stacker, generally designated 10, and showing a stack 11 formed thereon at the usual and well-known downwardly inclined angle, such as shown in FIG. 2. The stack 11 is moved rightward, as viewed in FIG. 1, and a conventional strapper or binder 12 provides a strap at 15 around the bundle, in the conventional manner well-known to anyone skilled in the art. The stack 11 moves from the stacker and strapper to the position shown centrally in FIG. 1, and that is a horizontal position for the stack 11. Thus, FIGS. 2 and 3 show the stacker 10 in the respective reclining and horizontal positions, under the influence of a tilting cylinder assembly 13.

Figure 3:
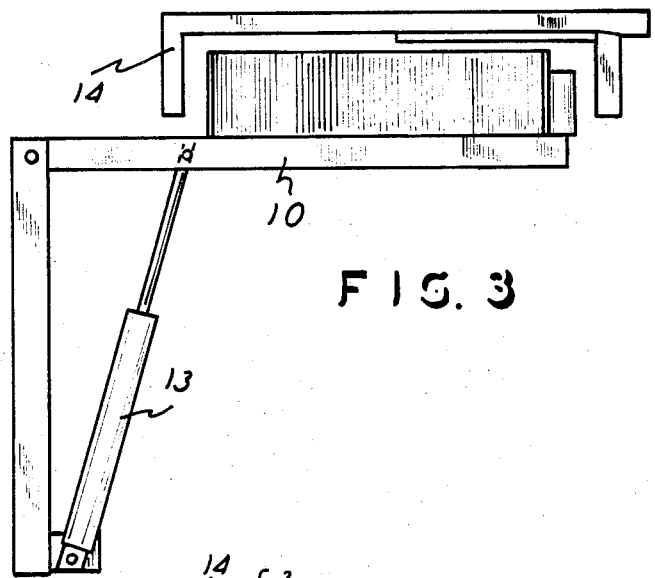
FIG. 3 is a side elevational view of FIG. 2 in a second position, and with a clamp added thereto.
Figure 4:
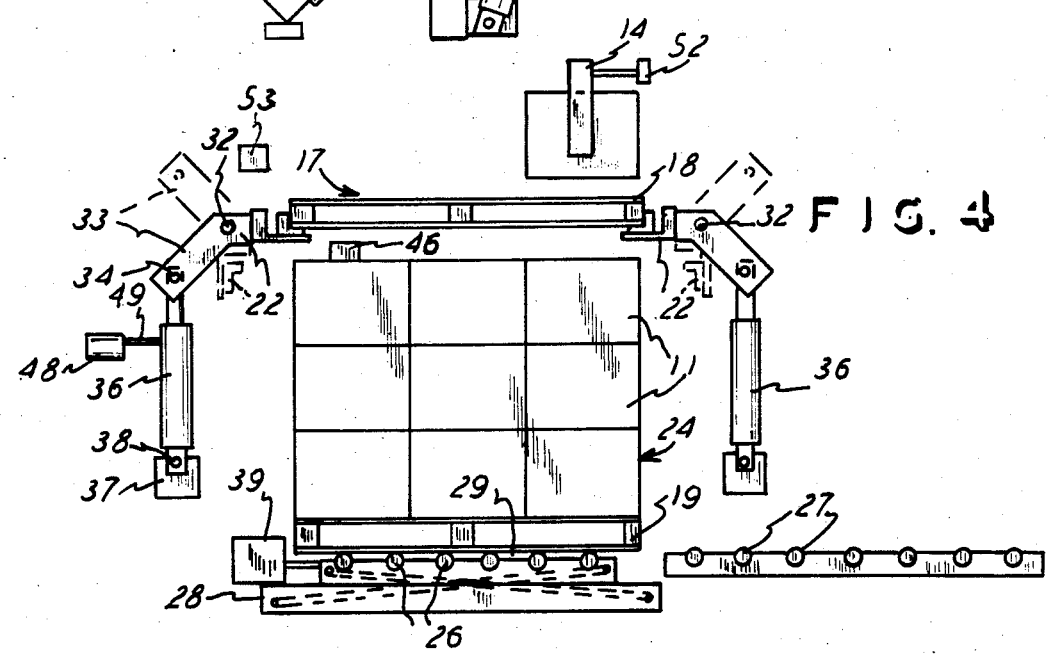
FIG. 4 is an end view of the loading station of this invention.

Thus, with the stack in the horizontal position of FIG. 3, a stack conventional clamp 14, such as that shown in U.S. Pat. No. 4,111,310, and which is under the influence of an overhead crane which is not shown but is also conventional, engages the stack 11 and lifts it into the loading area generally designated 16. FIG. 4 shows the stack 11 in the grip of the conventional clamp 14 and in that elevated position generally designated 17. A pallet 18 is also shown in the elevated position 17, and it is immediately beneath the stack 11 which is lowered onto the pallet 18 in an appropriate position to provide for placement of several bundles 11 in side-by-side positions in one layer on the pallet 18, such as shown with the bundles 11 on the already lowered pallet designated 19 in FIG. 4.

FIG. 1 shows a pallet hopper, generally designated 20, which has the pallets thereon in a position adjacent the loading station 16. The pallets 18 are suitably positioned onto a pallet holder designated 21 and shown in FIG. 1 to consist of two spaced-apart angle rails 22 which are spaced-apart the distance of the dimension across the pallet 18, as shown. Also, the rails 22 have angulated ends 23 which serve as lead ends for the sliding of the pallet 18 horizontally and onto the holder 21, such as shown in the pallet supported position in FIGS. 4 and 6.

With the pallet 18 in the position shown in FIG. 4, it will be seen and understood that the bundles 11 can be deposited onto the pallet 18 in sequential order so that the pallet 18 is loaded with some of the bundles 11, such as the lower layer of bundles designated 24 on the pallet 19.

While the lower layer of bundles is being positioned on the pallet 18 then supported on the pallet holder 21, the lower pallet 19 with its bundles 11 can be lowered to the position shown in FIG. 4 and moved laterally away from that position, such as by movement on rollers 26 and 27. That is, the pallet 19 is then on a scissors table 28 of a conventional arrangement, and shown herein, for raising and lowering its table top 29 which incorporates the rollers 26 for the lateral movement mentioned.

Figure 5:
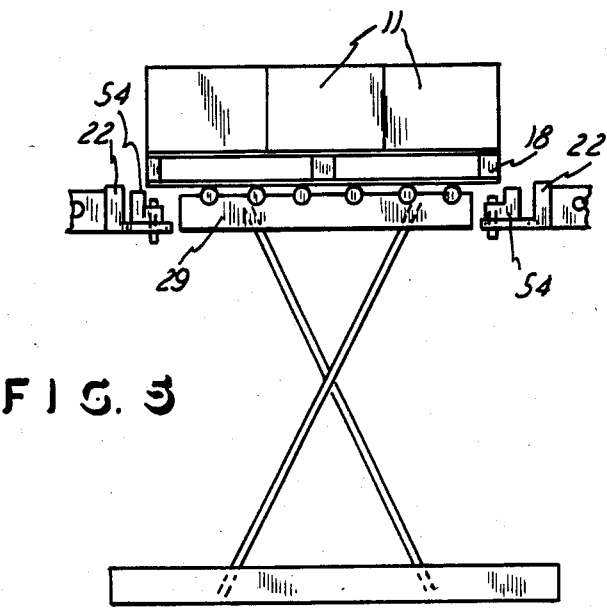
FIG. 5 is an end view of the loading station of this invention.

After removal of the pallet 19 with its bundles 11 and onto the rollers 27, the scissors table 28 can again operate to raise its top 29 to the elevation 17 and lift the pallet 18 off the holder 21, such as shown in FIG. 5. With the pallet 18 thus supported on the scissors table 28 in that elevated position 17, the pallet holder 21 can then be moved out of the holding position of the pallet, such as by swinging the rails 22 to the dotted position shown in FIG. 4. With the holder 21 out of the way or clear of the pallet 18, the pallet 18 and its bundles 11 can be lowered generally one layer of bundles 18 and the overhead crane and clamp 14, supported on the crane rail 31 can continue loading the bundles onto the pallet 18, such as in the second layer of bundles 11. Subsequently, the scissors table 28 would lower another layer of bundles 11 and then the third or upper layer of bundles 11 could be positioned onto the then lowered pallet 18 to complete loading the pallet 18 if three layers of bundles 18 are desired. Of course, the process is then repeated with the non-stop movement of the loading of the bundles 11 onto a third pallet positioned onto the holder 21 while the pallet 18 is lowered to the elevation of the rollers 27 and moved thereon and out of the way.

The holder 21 includes the two spaced-apart rails or members 22 shown pivotally mounted on pivots 32 suitably supported on a frame, and the members 22 have arms 33 extending to a pin 34 which connects to a fluid cylinder assembly 36. The assembly 36 is pivotally mounted on a frame portion 37, by means of pivot pin 38. It will therefore be seen and understood extension of the cylinder assembly 36, whether pneumatic or hydraulic, will swing the arm 33 to the dotted position shown in FIG. 4, and thus move the rails 22 downwardly through ninety degrees of pivot and out of the way of the lowering movement of the pallet 18.

That arrangement includes the relationship of the scissors table top 29 being narrower than the shortest distance between the holder rails 22, as clearly shown in FIG. 5.

When the scissors table top 29 is in the FIG. 4 lowered position, a roller drive motor 39 is suitably connected with the roller 26 to drive the rollers to displace the lowered pallet, such as the pallet 19, rightwardly and onto the rollers 27.

Figure 6:
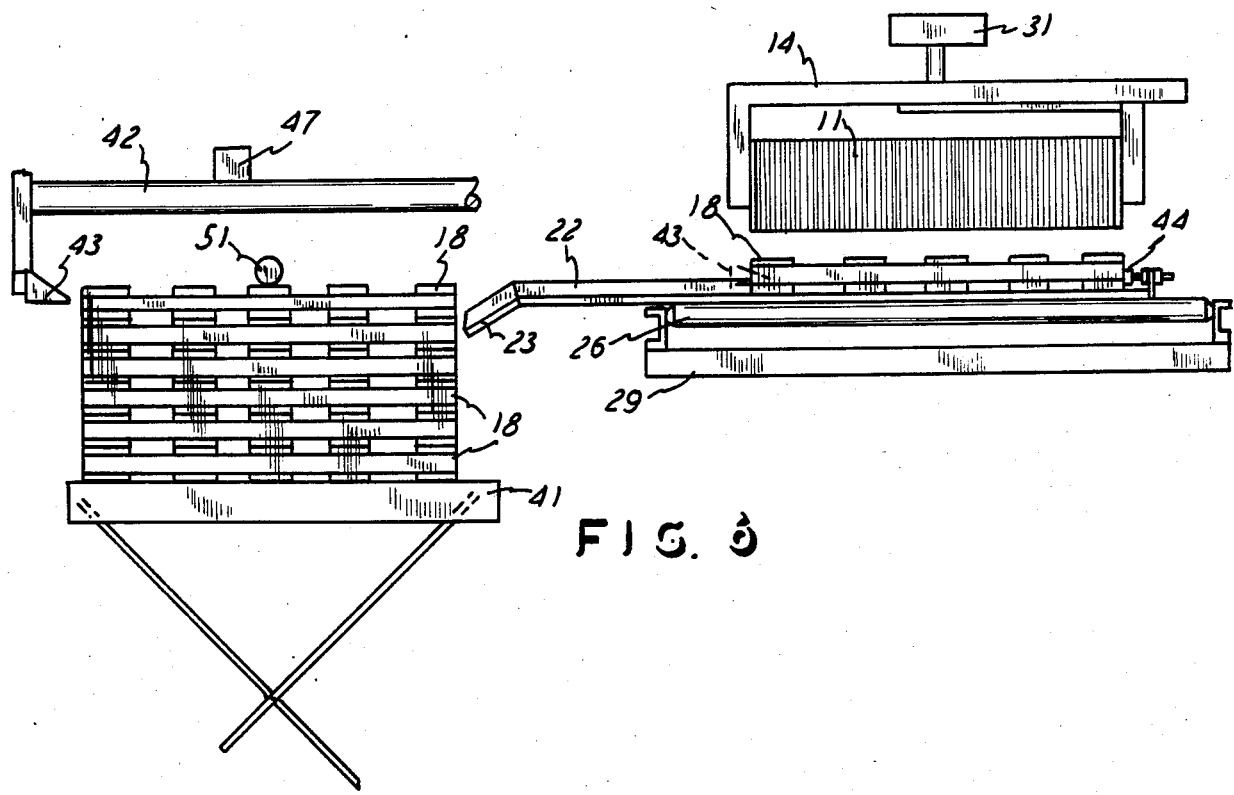
FIG. 6 is a side elevational view of the pallet section, including the pallet holder.

FIG. 6 shows that the pallet hopper 20 can be a scissors table 41 and a plurality of pallets designated 18 is shown thereon. As mentioned, these pallets rise to the elevation 17 which is the elevation of the pallet holder 21, as shown in FIG. 6. Thus, sliding the uppermost pallet 18 rightwardly, as viewed in FIG. 6, will position that pallet 18 onto the holder 21 and underneath the position that the overhead crane or lift means or clamp 14 will deposit the bundle 11 onto the pallet 18.

A pallet pusher 42 is shown adjacent the stack of pallets 18, and it will be understood that it can be a fluid cylinder which would move a pusher finger 43 rightwardly, as viewed in FIG. 6, to push the top pallet 18 onto the rails 22 and against a stop 44 which can be an adjustable stop so that the precise location of the pallet 18 can be accomplished. As previously mentioned, eventually the table top 29 with its rollers 26 will rise to a position above the rails 22 and thus lift the pallet 18 off the rails 22, in the arrangement also indicated in FIG. 6.

With that system, the apparatus and method described herein permit the continuous palletizing of the bundles 11 without interruption for the removal of one loaded pallet before commencing the placement of bundles onto the next pallet. Further, it will be seen and understood that automated controls are employed for synchronizing the various motions mentioned. That is, a sensing switch 46 senses the lowering of the pallet 19 toward the position shown in FIG. 4, and that signal is sent to a switch 47 connected to the pusher 42 for the pallet 18 and thus the pallet 18 is positioned onto the rails 22 which have been placed into the full line position or closed position shown in FIGS. 4 and 6, under the control of a switch 48 having a connection 49 with the cylinder assembly 36 for controlling them and thus swinging the holders 22 into and out of holding positions mentioned. That is, through conventional switches 46, 47, and 48, the sequencing of the rolling of a filled pallet and the closing of the holder 21 and the positioning of the next pallet can all be automatically accomplished through conventional mechanism. Further, a conventional photo eye 51 can be positioned at the elevation 17 and can be connected to a standard drive or control for the pallet hopper table 41 to raise the table 41 to that position where the uppermost pallet 18 is at the elevation 17 and ready for sliding insertion onto the rails 22, as described. Likewise, photo sensors can be utilized on the clamp 14, such as the sensor 52 which is available for the lateral positioning of the bundle 11 in its correct position on the pallet so that the bundles are in tight side-by-side position, as shown. Finally, another photo sensor, such as the sensor 53, can be positioned adjacent the loading elevation 17 for determining the completion of a layer of bundles 11 on the pallet and then control the lowering of the table 28, layer by layer. Those photo sensors mentioned and described are conventional and can be arranged and utilized, such as shown in U.S. Pat. Nos. 4,419,035 and 4,519,740 with respect both the positioning of the bundles on the pallet and also the lowering of the scissors table.

FIG. 5 shows that the pallet holder 21 is arranged to have its holding member 22 adjustable toward and away from each other, such as by provision for the additional angle members 54 which can be fastened to the base members 22, all to adjust to the widths of the pallet 18, in the relationship as shown in FIG. 5.

What is claimed is:

1. A system for automating the stacking of bundles onto a pallet, comprising a pallet holder disposed at a set elevation and movable to a closed position for holding a pallet at said set elevation and to an open position for releasing said pallet, a control means connected with said pallet holder for moving said pallet holder between said open position and said closed position, a first pallet disposed on said pallet holder, lift means for lifting said bundles and placing them onto said first pallet, an elevator vertically movable directly beneath said first pallet and to a first position above said set elevation for supporting said first pallet with its said bundles and subsequently to a second position below said set elevation while said control means moves said pallet holder to said open position, a second pallet, a pallet mover operative on said second pallet for positioning said second pallet onto said pallet holder after said first pallet with its said bundles is lowered to said second position and when said pallet holder is in said closed position, and horizontal transfer means operative on said first pallet with its said bundles for moving said first pallet with its said bundles to a position horizontally offset from said elevator while said lift means is placing bundles onto said second pallet.

2. The system for automating the stacking of bundles onto a pallet, as claimed in claim 1, wherein said pallet mover includes a pallet positioner for moving said pallets onto said pallet holder, and control members connected with said pallet positioner and with said elevator and being interconnected for controlling operation of said elevator toward said second position in timed sequence with and prior to moving one of said pallets onto said pallet holder.

3. The system for automating the stacking of bundles onto a pallet, as claimed in claim 2, including additional control members connected with said pallet holder and with said lift means, for sequential operation of said elevator and then said pallet holder and then said pallet positioner and then said lift means for moving one of said bundles onto one of said pallets while said elevator is being lowered to said second position.

4. The system for automating the stacking of bundles onto a pallet, as claimed in claim 1, wherein said horizontal transfer means includes a powered member for power driving said pallets with said bundles to said offset position.

5. The system for automating the stacking of bundles onto a pallet, as claimed in claim 1, wherein said pallet mover includes raising means for raising said pallets to said set elevation.

6. The system for automating the stacking of bundles onto a pallet, as claimed in claim 5, wherein said raising means is comprised of a pallet hopper for holding and singularly supplying a plurality of said pallets to said pallet holder.

7. The system for automating the stacking of bundles onto a pallet, as claimed in claim 1, wherein said pallet holder includes spaced apart and horizontally extending members movable toward and away from each other for respectively supporting opposite sides of said pallets on said pallet holder and being movable away from each other to an extend beyond the maximum dimension between said opposite sides to thereby allow for the noncontact passage of said pallet between said extending members.

8. The system for automating the stacking of bundles onto a pallet, as claimed in claim 7, wherein said pallet holder extending members are pivotally mounted for pivot movement toward and away from each other.

9. The system for automating the stacking of bundles onto a pallet, as claimed in claim 1, including pallet guide means extending between said pallet mover and said pallet holder for slidable guiding of said pallets onto said pallet holder.

10. The system for automating the stacking of bundles onto a pallet, as claimed in claim 1, wherein said pallet holder includes upstanding portions spaced apart the dimension of said pallet resting on said pallet holder, for holding said pallet on said pallet holder.

11. A system for automating the stacking of bundes onto a pallet, comprising a stacker for forming sheets into discrete bundles, a strapper for placing a strap around each of said bundles, lift means for lifting said bundles and moving said bundles along a path of movement and for lowering said bundles at a location along said path, a pallet holder at said location, a pallet on said pallet holder, and an elevator for supporting said pallet to lower said pallet to an elevation below said location after said pallet holder releases said pallet.

12. The system for automating the stacking of bundles onto a pallet, as claimed in claim 11, wherein said pallet holder includes means for opening and closing relative to said pallet for the alternate support and release of said pallet.

13. The system for automating the stacking of bundles onto a pallet, as claimed in claim 11, wherein said pallet holder includes two spaced-apart members at opposite sides of said pallet, and with said members being movable away from each other for the passage of said pallet between said members during the lowering of said pallet.

14. A method of stacking bundles onto a pallet, comprising the steps of collecting sheets into elongated and discrete bundles, tying said bundles to secure each of said bundles in a discrete form of a compact bundle, positioning a first pallet in an elevated position at a bundle loading station, individually lifting said discrete bundles and separately placing them onto said first pallet until a plurality of said bundles is on said first pallet, lowering said first pallet with its said bundles thereon to an elevation clear of and lower than said elevated position and to a location offset from the path of lowering and simultaneously positioning a second pallet at said elevated position and individually lifting more of said discrete bundles and separately placing them onto said second pallet.

15. The method of stacking bundles onto a pallet, as claimed in claim 14, including the step of collecting and tying said sheets on a plane with the longitudinal axis of said discrete bundles being inclined relative to the horizon, and tilting said discrete bundles to the horizontal position from where said discrete bundles are lifted onto said pallets.

16. The method of stacking bundles onto a pallet, as claimed in claim 14, including the step of releasably supporting all said pallets at said bundle loading station with retractable pallet supports, and retracting said supports for the lowering of said pallets with said bundles to said elevation lower than said elevated position.

17. The method of stacking bundles onto a pallet, as claimed in claim 16, including the step of separately and horizontally sequentially sliding said pallets onto said supports after a previous one of said pallets with its said bundles is lowered clear of said elevated position and to said lower elevation.

18. The method of stacking bundles onto a pallet, as claimed in claim 14, wherein the steps of lifting and placing said discrete bundles onto said pallets are achieved by operation of an overhead-type of bundle-lift crane.

* * * * *